Oct. 2, 1951     E. M. OTTO     2,569,491
DRY CELL COMPOSITION

Filed June 27, 1946     2 Sheets-Sheet 1

Inventor
EARL M. OTTO

By M. A. Hayes

Attorney

Oct. 2, 1951   E. M. OTTO   2,569,491
DRY CELL COMPOSITION
Filed June 27, 1946   2 Sheets-Sheet 2

Inventor
EARL M. OTTO
By M. O. Hayes
Attorney

Patented Oct. 2, 1951

2,569,491

UNITED STATES PATENT OFFICE 2,569,491

DRY CELL COMPOSITION

Earl M. Otto, Washington, D. C.

Application June 27, 1946, Serial No. 679,637

4 Claims. (Cl. 136—153)

(Granted under the act of March 3, 1883, as amended April 30, 1928; 370 O. G. 757)

This invention relates to a dry cell of the LeClanche type, in which the solid components of the electrolyte, both in the black mix and in the separator wall, remain substantially in solution at abnormally low temperatures, that is, temperatures at which the ordinary ammonium chloride dry cell has very little or no electrical output.

It is the object of this invention to provide a dry cell which will have improved operating characteristics over all or part of the range of temperature from −20° C. to −50° C.

Calcium chloride has previously been proposed as a complete substitute for ammonium chloride for low temperature dry cells. For other reasons, it has also been added in small quantities to zinc chloride-ammonium chloride mixtures, but it is the purpose of this invention to show that only in certain limited proportions can aqueous solutions of the chlorides of calcium, ammonium and zinc be made to serve as satisfactory electrolytes at abnormally low temperatures. No one has shown heretofore that appreciable quantities of calcium chloride, ammonium chloride and zinc chloride in aqueous solutions are compatible at −20° to −45° C. I have found that, when the concentration of the dihydrate of calcium chloride is between 10% and 30% and that of the zinc chloride is between 10% and 40%, the solubility of ammonium chloride may be even greater than 15% at −30° C. I have found that some electrolytes from this region give dry cells with good performance at low temperatures. By using as little zinc chloride as required to prevent or reduce freezing of the electrolyte at a certain low temperature, good cell performance at that temperature is obtained. It is not necessary that, for best electrical performance, all the ammonium chloride be in solution at the specified low temperature. Thus, the electrolyte of one of the preferred formulas begins crystallization at −21° C. This procedure is in accord with the common practice of incorporating in the ordinary dry cell much more ammonium chloride than will dissolve at room temperature.

Figure 1:
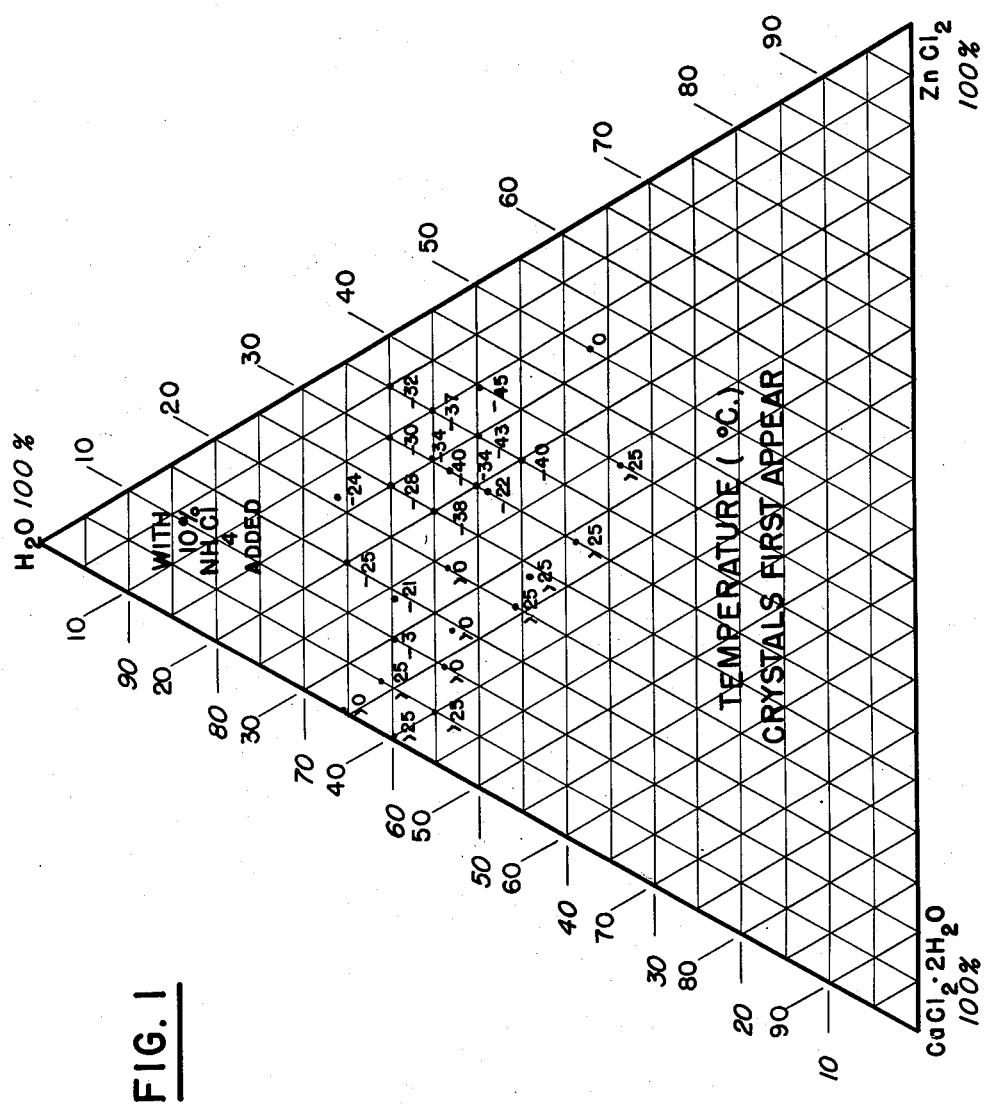

Many of the attendant advantages of this invention will be readily appreciated as the same becomes better understood by reference to the following detailed description when considered in connection with the accompanying drawings wherein:

Figure 1 is a triaxial diagram indicating freezing points of electrolytes having as their ingredients calcium chloride, zinc chloride, ammonium chloride and water. The temperatures recorded are those at which the first signs of crystallization appear. The marking >0 is used to denote that the initial freezing point is above 0° C., but below plus 25° C.

Figure 2:
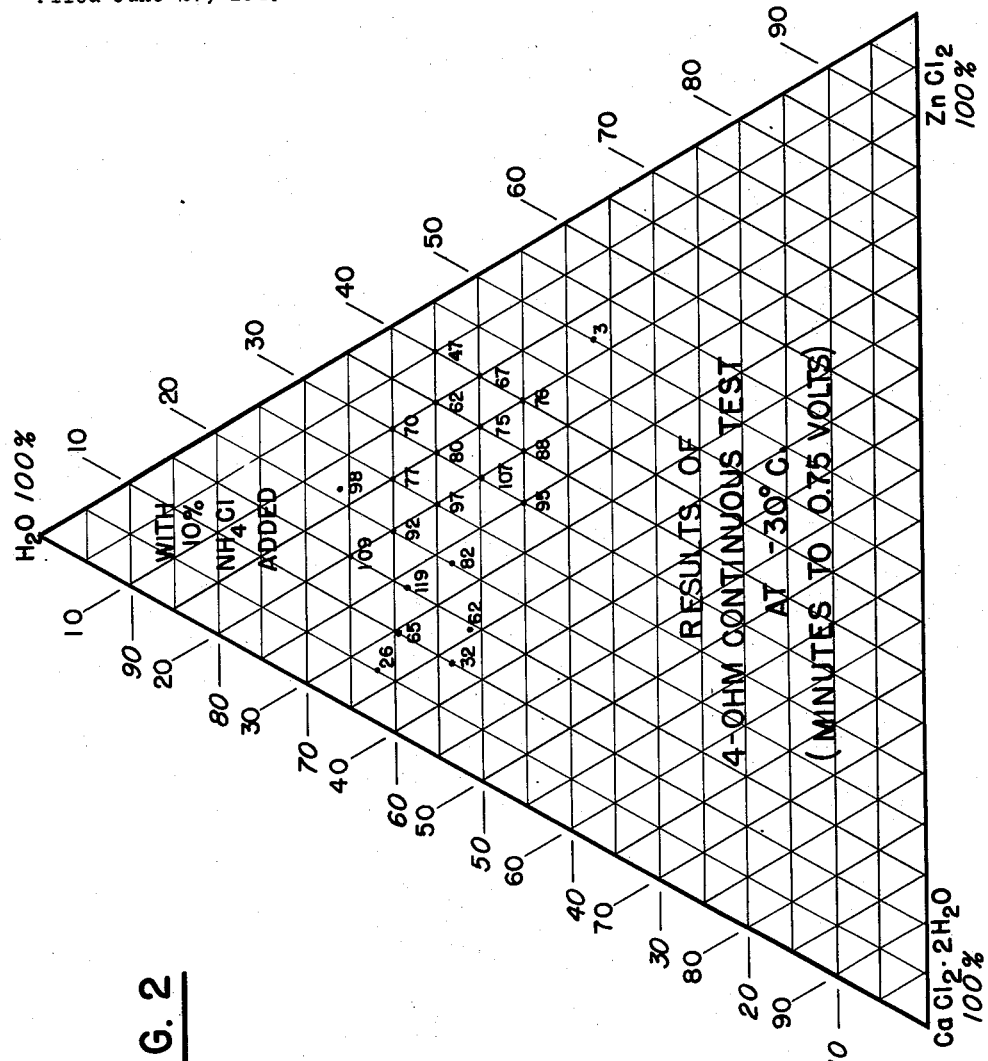

Figure 2 is a triaxial diagram of results of capacity tests performed on dry cells having the electrolytes of Figure 1.

The results of initial 4-ohm and 16-ohm continuous tests on several lots of cells approximately 2¼ inches high by 1¼ inches diameter, referred to in the art as D-size cells, are given in the following table. For comparison purposes results on an ordinary ammonium chloride type cell are included. The first three lots were composed of natural manganese dioxide ore and graphite in a ratio of 2½ to 1 wet down with electrolyte whereas the next 3 were composed of natural ore and acetylene black in a ratio of 8 to 1. The compositions of the electrolyte used for mix and paste are given in the table. For the paste wall, flour and starch in the ratio of 1 to 2 were added to a quantity of electrolyte until the paste, when completely gelatinized, had the desired consistency. Mercuric chloride was added to the paste in such a quantity that each D size zinc can had approximately 0.22 g. It is seen from the table that 10 g. of ammonium chloride added to a mixture of 13 g. of dihydrate of calcium chloride, 21 g. of zinc chloride and 66 ml. of water gives better output at −30° C. than 5 g. or 15 g. of ammonium chloride added to the same mixture. For other temperatures, the optimum quantity of ammonium chloride may be more or less than this 10 g., as high as 20 g. being usable. More data on initial 4-ohm capacity tests at −30° C. are given in Figure 2 of the drawings which is also a triaxial diagram of the three electrolyte components: $CaCl_2 \cdot 2H_2O$, $ZnCl_2$, $H_2O$. It is clearly seen that for this particular test at this particular temperature best results are obtained with a composition of 26.5% $CaCl_2 \cdot 2H_2O$ and 15% $ZnCl_2$, by weight, to which is added ammonium chloride equal to 10% of the total weight of this composition. Increasing any one component and decreasing another in a regular manner causes a tapering off of the capacity, the effect being much greater in some directions than others. The composition of the carbon-manganese materials forms no part of this invention, it being understood that any or all are usable with the electrolyte claimed in this invention. Likewise, the nature of the separator wall may be of the cereal, thermo-plastic or any other type, the only condition being that the component of the wall, as well as of the black mix, be compatible with the electrolyte claimed in this invention.

Results of electrical tests

| Electrolyte | | | | +21° C., OCV[1] | −30° C., OCV[1] | Continuous Tests at −30° C. | | | |
| --- | --- | --- | --- | --- | --- | --- | --- | --- | --- |
| | | | | | | 4-Ohm | | 16-Ohm | |
| CaCl₂.2H₂O | ZnCl₂ | H₂O | NH₄Cl | | | Initial CCV[2] | To 0.75 v. | Initial CCV[2] | To 0.75 v. |
| g. | g. | ml. | g. | v. | v. | v. | Min. | v. | Min. |
| 13 | 21 | 66 | 5 | 1.57 | 1.52 | 1.12 | 14 | 1.39 | 260 |
| 13 | 21 | 66 | 10 | 1.58 | 1.53 | 1.20 | 30 | 1.41 | 418 |
| 13 | 21 | 66 | 15 | 1.59 | 1.56 | 1.17 | 26 | 1.37 | 282 |
| 20 | 30 | 50 | 10 | 1.63 | 1.60 | 1.38 | 107 | 1.53 | 800 |
| 26.5 | 15 | 58.5 | 10 | 1.66 | 1.62 | 1.41 | 119 | 1.55 | 738 |
| 26.5 | 20 | 53.5 | 10 | 1.66 | 1.62 | 1.25 | 82 | 1.54 | 833 |
| Ordinary NH₄Cl type | | | | 1.58 | 1.28 | 0.01 | 0 | 0.05 | 0 |

[1] OCV denotes open circuit voltage.
[2] CCV denotes closed circuit voltage.

There are many formulas possible within the scope of this invention, the following being examples only.

| | Electrolyte #1 | Electrolyte #2 |
| --- | --- | --- |
| CaCl₂.2H₂O _____ g__ | 20 | 26.5 |
| ZnCl₂ _____ g__ | 30 | 15.0 |
| NH₄Cl _____ g__ | 10 | 10.0 |
| H₂O _____ ml__ | 50 | 58.5 |

Reference to the above table shows that these two electrolytes are operative at low temperatures and deliver a relatively constant output for a considerable period of time against closed circuit resistance.

The compositions of the electrolytes have been designed for initial performance of dry cells. Since certain materials are partially consumed on shelf, it is understood that such quantities, as needed for satisfactory shelf life, may be added.

A preferred complete formula for the bobbin and paste compositions comprises:

Bobbin depolarizer composition

MnO₂ _____ g__ 200
Acetylene Black _____ g__ 25
Electrolyte #2 _____ ml. approx__ 75

Paste composition

Flour _____ g__ 5.7
Starch _____ g__ 11.4
Electrolyte #2 _____ ml__ 86.
Mercuric chloride _____ g__ 0.202

While particular or specific compositions have been given in this table, it is not desired to be strictly limited thereto, as some variation from the particular percentages given may be made without affecting the performance of the cells. Such variations are included within the scope of this invention to the extent as defined by the herewith appended claims.

The invention described herein may be manufactured and used by or for the Government of the United States of America for governmental purposes without the payment of any royalty thereon or therefor.

I claim:

1. An electrolyte composition for low temperature dry cells comprising a solution of from 40 to 65% H₂O, 10 to 30% CaCl₂.2H₂O and 10 to 40% ZnCl₂, and a quantity of NH₄Cl equal to 5 to 20% by weight of said solution.

2. An electrolyte composition for dry cells characterized by a relatively high capacity at low temperatures comprising the following components approximately in the proportions by weight indicated:

26.5, CaCl₂.2H₂O
15.0, ZnCl₂
58.5, H₂O
10.0, NH₄Cl

3. A dry cell characterized by a relatively high capacity at low temperatures comprising the following respectively, approximately in the weight proportions stated:

Bobbin depolarizer composition

MnO₂ _____ g__ 200
Acetylene black _____ g__ 25
Electrolyte _____ ml__ 75

Paste composition

Flour _____ g__ 5.7
Starch _____ g__ 11.4
Electrolyte _____ ml__ 86.
HgCl₂ _____ g__ 0.202

Electrolyte composition

| | Grams |
| --- | --- |
| CaCl₂.2H₂O | 26.5 |
| ZnCl₂ | 15.0 |
| H₂O | 58.5 |
| NH₄Cl | 10.0 |

4. An electrolyte composition for a dry cell consisting essentially in the proportions by weight of:

| | Gms. |
| --- | --- |
| Calcium dichloride dihydrate | 21.2 |
| Zinc chloride | 21.2 |
| Water | 57.6 |
| Ammonium chloride | 10.0 |
| | 110.0 |

EARL M. OTTO.

REFERENCES CITED

The following references are of record in the file of this patent:

UNITED STATES PATENTS

| Number | Name | Date |
| --- | --- | --- |
| 1,039,949 | Jaeger | Oct. 1, 1912 |
| 1,123,843 | Burger | Jan. 5, 1915 |
| 1,430,727 | De Olaneta | Oct. 3, 1922 |
| 1,497,317 | Askin | June 10, 1924 |
| 2,403,571 | Wilke | July 9, 1946 |

OTHER REFERENCES

Kameyama et al., J. Society of Chemical Industry, Japan, volume 39, page 875 (1936).